United States Patent
Lore et al.

(10) Patent No.: US 12,212,858 B2
(45) Date of Patent: Jan. 28, 2025

(54) OBJECT RECONSTRUCTION WITH NEUROMORPHIC SENSORS

(71) Applicant: Raytheon Company, Arlington, VA (US)

(72) Inventors: Kin Gwn Lore, Belmont, MA (US); Ganesh Sundaramoorthi, Duluth, GA (US); Kishore K. Reddy, Farmington, MA (US)

(73) Assignee: Raytheon Company, Arlington, VA (US)

( * ) Notice: Subject to any disclaimer, the term of this patent is extended or adjusted under 35 U.S.C. 154(b) by 2 days.

(21) Appl. No.: 18/138,976

(22) Filed: Apr. 25, 2023

(65) Prior Publication Data

US 2024/0365014 A1    Oct. 31, 2024

(51) Int. Cl.
*H04N 23/95* (2023.01)
*H04N 23/84* (2023.01)
*H04N 25/47* (2023.01)

(52) U.S. Cl.
CPC ............. *H04N 23/95* (2023.01); *H04N 23/84* (2023.01); *H04N 25/47* (2023.01)

(58) Field of Classification Search
CPC ......... H04N 23/95; H04N 23/84; H04N 25/47
See application file for complete search history.

(56) References Cited

U.S. PATENT DOCUMENTS

| | | | |
|---|---|---|---|
| 9,449,647 B2* | 9/2016 | Sharpe | G11B 27/034 |
| 11,301,702 B2* | 4/2022 | Ryan | G06V 20/597 |
| 11,860,034 B2* | 1/2024 | Ritter | G01J 3/45 |
| 2002/0094135 A1* | 7/2002 | Caspi | G06T 7/20 |
| | | | 348/E5.054 |
| 2020/0265590 A1* | 8/2020 | Daniilidis | G06T 7/269 |
| 2020/0388068 A1* | 12/2020 | Yeung | G06N 20/00 |
| 2023/0021408 A1* | 1/2023 | Cohen-Duwek | B25J 9/1664 |
| 2024/0212166 A1* | 6/2024 | Sundaramoorthi | G06T 3/18 |

* cited by examiner

*Primary Examiner* — Hung H Lam
(74) *Attorney, Agent, or Firm* — Schwegman Lundberg & Woessner, P.A.

(57) ABSTRACT

Systems and methods are provided for performing image processing. An exemplary method includes: receiving neuromorphic camera data from at least one neuromorphic camera; producing, using the neuromorphic camera data, a plurality of unaligned event data, where the unaligned event data are unaligned in time; aligning the unaligned event data in time producing aligned event data; generating, using a model and the aligned event data, a plurality of aligned event volumes; and aggregating the aligned event volumes to produce an image.

20 Claims, 6 Drawing Sheets

OBJECT RECONSTRUCTION WITH NEUROMORPHIC SENSORS

BACKGROUND

Three-dimensional (3D) reconstruction of a scene or object is essential for various mechanical or intelligence analyses. The current state of the art leverages Multiview RGB images captured from different angles and attempts to reconstruct 3D scenes/objects from these images. However, the current state of the art is better capable of handling static images rather than dynamic images with a combination of moving objects and/or cameras.

There is a need for rendering from event data that models dynamic scenes.

SUMMARY

According to one aspect of the subject matter described in this disclosure, an example system for performing image processing is provided. The system includes one or more computing device processors, and one or more computing device memories. The one or more computing device memories are coupled to the one or more computing device processors. The one or more computing device memories storing instructions executed by the one or more computing device processors. The instructions are configured to: receive neuromorphic camera data from at least one neuromorphic camera; produce, using the neuromorphic camera data, a plurality of unaligned event data, where the unaligned event data are unaligned in time; align the unaligned event data in time producing aligned event data; generate, using a model and the aligned event data, a plurality of aligned event volumes; and aggregate the aligned event volumes to produce an image.

In some implementations, the neuromorphic camera data includes information regarding at least one pose of at least one neuromorphic camera. The neuromorphic camera data may include data associated with a dynamic scene. The dynamic scene may include at least one moving object. The dynamic scene may include data from at least one moving neuromorphic camera. The unaligned event data may include two-dimensional (2D) multiview event volumes. The aligned event data may include multiview event volumes aligned in time. The model may include a neural radiance field (NeRF) model. The NeRF model may include colored image modalities, such as RGB modalities, grey-scale modalities, HSV (hue, saturation, value) modalities, or the like, for modeling static objects. Using the aligned event data, one may generate reconstructed colored aligned event data for rendering one or more views in a colored image space.

According to another aspect of the subject matter described in this disclosure, an example method for performing image processing is provided. The method includes the following: receiving neuromorphic camera data from at least one neuromorphic camera; producing, using the neuromorphic camera data, a plurality of unaligned event data, where the unaligned event data are unaligned in time; aligning the unaligned event data in time producing aligned event data; generating, using a model and the aligned event data, a plurality of aligned event volumes; and aggregating the aligned event volumes to produce an image.

In some implementations, the neuromorphic camera data includes information regarding at least one pose of at least one neuromorphic camera. The neuromorphic camera data may include data associated with a dynamic scene. The dynamic scene may include at least one moving object. The dynamic scene may include data from at least one moving neuromorphic camera. The unaligned event data may include two-dimensional (2D) multiview event volumes. The aligned event data may include multiview event volumes aligned in time. The model may include a neural radiance field (NeRF) model. The NeRF model may include colored image modalities for modeling static objects. Using the aligned event data, one may generate reconstructed colored image aligned event data for rendering one or more views in an colored image space.

According to another aspect of the subject matter described in this disclosure, an example non-transitory computer-readable storage medium storing instructions which when executed by a computer cause the computer to perform an example method for performing image processing is provided. The method includes the following: receiving neuromorphic camera data from at least one neuromorphic camera; producing, using the neuromorphic camera data, a plurality of unaligned event data, where the unaligned event data are unaligned in time; aligning the unaligned event data in time producing aligned event data; generating, using a model and the aligned event data, a plurality of aligned event volumes; and aggregating the aligned event volumes to produce an image.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first." "second," and other numerical terms, when used herein, do not imply a sequence or order unless clearly indicated by the context.

This disclosure describes systems and methods for performing image processing. An architecture for image processing is provided that utilizes a neural radiance field (NeRF) learning that can leverage neuromorphic (NM) event cameras instead of/in addition to colored images, such as RGB images, greyscale images, HSV (hue, saturation, value) image, or the like, for three-dimensional (3D) or two-dimensional (2D) images for scene or object reconstructions. Moreover, architecture leverages the capabilities of neuromorphic cameras and its NeRF model to improve the image quality of objects and/or event cameras moving in a dynamic scene.

Figure 1:
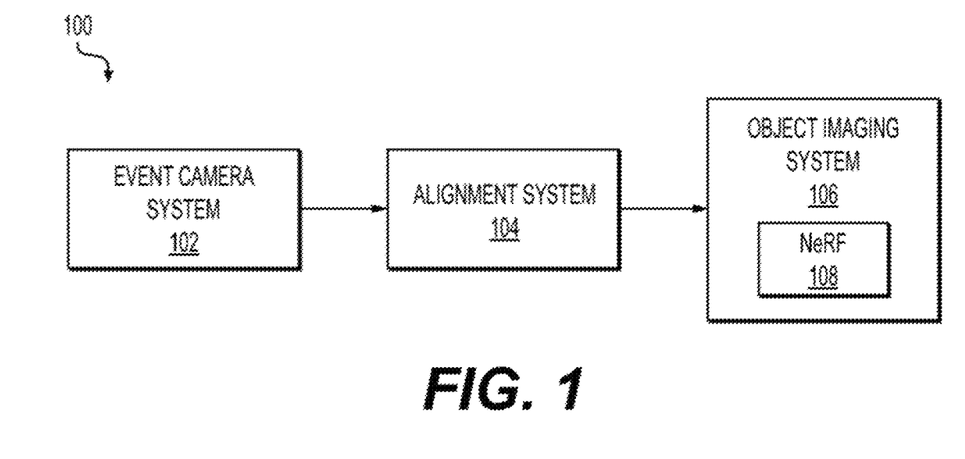
FIG. 1 is a schematic diagram of a first example image processing architecture for an event-based image process.

FIG. 1 is a schematic diagram of an example image processing architecture 100 for event-based image process. Architecture 100 includes an event camera system 102, an alignment system 104, and an object imaging system 106. The event camera system 102 may consist of one or more event cameras producing various unaligned event camera data. The event camera system 102 may aggregate the unaligned event camera data. Note the unaligned camera data are used to compute the unaligned time surfaces having blurred object boundaries due to aggregation. The event camera system 102 may send the unaligned event camera data to alignment camera system 104. In some implementations, event camera system 102 may store the event camera data to either a local or remote storage device, which is later sent by event camera system 102 to alignment system 104. In some implementations, event camera system 102 may include a processing system for generating the unaligned event camera.

Event camera system 102 may include a number of neuromorphic cameras for capturing the unaligned camera data. Event camera system 102 may collect imaging information about a scene or object, such pixels or light intensity information or the like. This imaging information is used by event camera system 102 to generate the unaligned event data. Neuromorphic cameras have high sampling rates compared to conventional cameras, capture fine details for scene/view reconstruction, and resistant to motion blur. Neuromorphic cameras may be a preferable choice for capturing images of dynamic scenes involving moving objects and/or cameras. A number of neuromorphic cameras may be positioned at various locations to capture a dynamic scene involving one or more moving objects. In some instances, each neuromorphic camera may move to capture the dynamic scene involving moving objects. Also, neuromorphic cameras have low power use and integrable to small devices/robots/drones for various ISR applications. Moreover, the unaligned camera data produced by neuromorphic cameras are event volumes. These event volumes include aggregated unaligned time surfaces associated with a captured scene.

An alignment system 104 receives the unaligned camera data from event camera system 102 and aligns the aggregated unaligned event camera data to a time for object imaging using such time surfaces. This requires the alignment system 104 to reduce object boundary blurring associated with aggregating asynchronous events over time from the unaligned event camera data by computing an alignment of aggregated events with respect to a time. The alignment system 104 utilizes an algorithm to align the aggregated unaligned event camera data.

Utilizing the algorithm, the alignment system 104 input events over a time interval Δt received from event camera system 102. The alignment system 104 computes time surfaces for intervals Δt'<Δt. Also, the alignment system 104 calculates dense optical flows between consecutive time surfaces. The dense optical flows are integrated over time to produce several mappings. For each time surface, the alignment system 104 computes the warp of the time surface, producing an aligned time surface. The details regarding aligning the aggregated unaligned event camera data are described in U.S. patent Ser. No. 18/088,094, the contents of which is included herein in its entirety. Note alignment system 104 may be implemented as a computer system to perform the operations of the algorithm.

The aligned event data may be input to an object imaging system 106. The object imaging system 106 may be remote or local to alignment system 104. With object boundary blurring lowered, the alignment system 104 provides a reliable signal to object imaging system 106 for imaging a dynamic scene. The object imaging system 106 includes a Neural Radiance Fields (NeRF) model 108 for processing the aligned time event data to produce an image of a dynamic scene. In particular, NeRF model 108 may produce a 3D volumetric representation that can concurrently explain events associated with the camera movement by aggregating relevant aligned event data of interests. Given the input of location and viewing direction of the camera(s) of camera system 102, NeRF model 108 outputs the volume density and emitted color, which can be aggregated to synthesize an image from an arbitrary viewpoint by the volume rendering. While NeRF model 108 is trained to minimize the color discrepancy between the synthesized image and the ground truth image, and it may also be trained with a loss function that incorporates the camera movements and the resulting events triggered by the difference of brightness.

In some implementations, NeRF model 108 may use colored image modality data, such as RGB modality data, greyscale modality data, HSV modality data, or the like, as an additional input to train NeRF model 108 to model static objects, to complement neuromorphic sensors that can only detect dynamic objects.

Non-neuromorphic event cameras can measure subtle brightness changes in high frame rates, the measurements in low lighting or extreme motion suffer from significant domain discrepancy with complex noise. The multi-view consistency of NeRF provides a powerful self-supervision signal for eliminating spurious measurements and extracting the consistent underlying structure despite highly noisy input. The aligned event data includes the event measurements accompanied by the movements of the neuromorphic cameras. Using the loss function that reflects the measurement model of the neuromorphic camera, NeRF model 108 creates an integrated neural volume that summarizes the unstructured and sparse data points captured for about 2-4 seconds.

The generated neural volume can also produce intensity images from novel views with reasonable depth estimates, which can serve as a high-quality input to various vision-based tasks. In particular, NeRF model 108 may use the generated neural volume to form synthesized 3D object/point cloud/views given a specified viewpoint. In some implementations, NeRF model 108 may use the generated neural volume to form event renderings (2D), RGB or other colored image renderings (2D), and/or depth maps.

Figure 2:
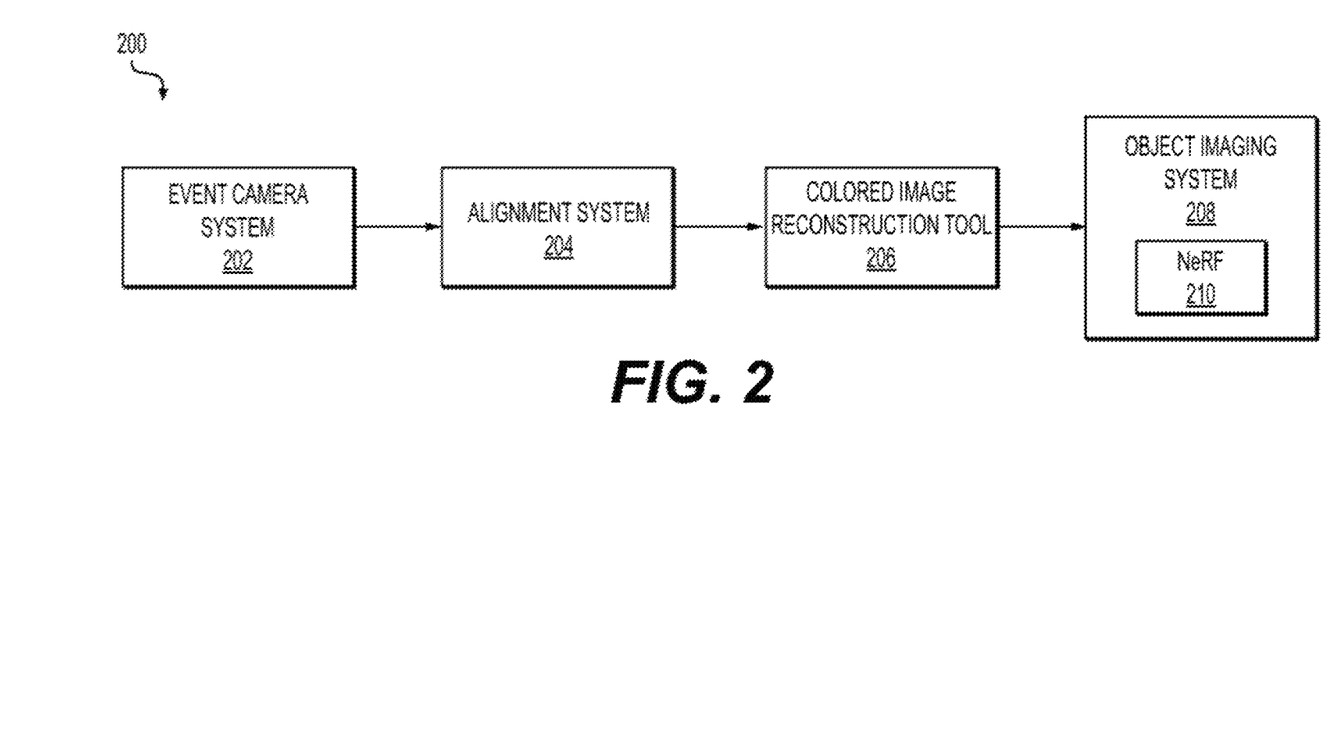
FIG. 2 is a schematic diagram of a second example image processing architecture for an event-based image process.

FIG. 2 is a schematic diagram of an example image processing architecture 200 for an event-based image process. Architecture 200 includes an event camera system 202, an alignment system 204, colored image reconstruction tool 206, and an object imaging system 208. The event camera system 202 may consist of one or more event cameras producing various unaligned event camera data. The event camera system 202 may aggregate the unaligned event camera data. Note the unaligned camera data are used to compute the unaligned time surfaces having blurred object boundaries due to aggregation. The event camera system 202 may send the unaligned event camera data to alignment camera system 204. In some implementations, event camera system 202 may store the event camera data to either a local or remote storage device, which is later sent by event camera system 202 to alignment system 204. In some implementations, event camera system 202 may include a processing system for generating the unaligned event camera.

Event camera system 102 may include a number of neuromorphic cameras for capturing the unaligned camera data. Event camera system 102 may collect imaging information about a scene or object, such pixels or light intensity information or the like. This imaging information is used by event camera system 102 to generate the unaligned event data. Neuromorphic cameras may be a preferable choice for capturing images of dynamic scenes involving moving objects and/or cameras. A number of neuromorphic cameras may be positioned at various locations to capture a dynamic scene involving one or more moving objects. In some instances, each neuromorphic camera may move to capture the dynamic scene involving moving objects. Also, neuromorphic cameras have low power use and integrable to small devices/robots/drones for various ISR applications. Moreover, the unaligned camera data produced by neuromorphic cameras are event volumes. These event volumes include aggregated unaligned time surfaces associated with a captured scene.

An alignment system 204 receives the unaligned camera data from event camera system 202 and aligns the aggregated unaligned event camera data to a time for object imaging using such time surfaces. This requires the alignment system 204 to reduce object boundary blurring associated with aggregating asynchronous events over time from the unaligned event camera data by computing an alignment of aggregated events with respect to a time. The alignment system 204 utilizes an algorithm to align the aggregated unaligned event camera data.

Utilizing the algorithm, the alignment system 204 input events over a time interval Δt received from event camera system 202. The alignment system 204 computes time surfaces for intervals Δt'<Δt. Also, the alignment system 204 calculates dense optical flows between consecutive time surfaces. The dense optical flows are integrated over time to produce several mappings. For each time surface, the alignment system 204 computes the warp of the time surface, producing an aligned time surface. The details regarding aligning the aggregated unaligned event camera data are described in U.S. patent Ser. No. 18/088,094, the contents of which is included herein in its entirety. Note alignment system 204 may be implemented as a computer system to perform the operations of the algorithm.

The aligned event data is received by a colored image reconstruction tool 206. The colored image reconstruction tool 206 is configured to produce aligned colored image event data for use in rendering novel views in a colored image space via reconstruction from event space using aligned event data. The novel views in the colored image space include reduced blurring associated with objects or cameras moving in a dynamic scene. The reconstruction tool 206 may use an RGB-D or other colored image input sequence by training a multi-layer perceptron. In some implementations, the reconstruction tool 206 may be a software system performed on a processing system.

The aligned event data and/or aligned colored image event data may be input to an object imaging system 208. The object imaging system 208 may be remote or local to alignment system 204. With object boundary blurring lowered, the alignment system 204 provides a reliable signal to object imaging system 208 for imaging a dynamic scene. The object imaging system 208 includes a Neural Radiance Fields (NeRF) model 210 for processing the aligned time event data to produce an image of a dynamic scene. In particular, NeRF model 210 may produce a 3D volumetric representation that can concurrently explain events associated with the camera movement by aggregating relevant aligned event data of interests. Given the input of location and viewing direction of the camera(s) of camera system 202, NeRF model 210 outputs the volume density and emitted color, which can be aggregated to synthesize an image from an arbitrary viewpoint by the volume rendering. While NeRF model 210 is trained to minimize the color discrepancy between the synthesized image and the ground truth image, and it may also be trained with a loss function that incorporates the camera movements and the resulting events triggered by the difference of brightness.

In some implementations, NeRF model 210 may use RGB modality data or HSV modality data as an additional input to train NeRF model 210 to model static objects, to complement neuromorphic sensors that can only detect dynamic objects.

Non-neuromorphic event cameras can measure subtle brightness changes in high frame rates, the measurements in low lighting or extreme motion suffer from significant domain discrepancy with complex noise. The multi-view consistency of NeRF provides a powerful self-supervision signal for eliminating spurious measurements and extracting the consistent underlying structure despite highly noisy input. The aligned event data includes the event measurements accompanied by the movements of the neuromorphic cameras. Using the loss function that reflects the measurement model of the neuromorphic camera, NeRF model 210 creates an integrated neural volume that summarizes the unstructured and sparse data points captured for about 2-4 seconds.

The generated neural volume can also produce intensity images from novel views with reasonable depth estimates, which can serve as a high-quality input to various vision-based tasks. In particular, NeRF model 210 may use the generated neural volume to form synthesized 3D object/point cloud/views given a specified viewpoint. In some implementations, NeRF model 210 may use the generated neural volume to form event renderings (2D), RGB other colored image renderings (2D), and/or depth maps.

Figure 3:
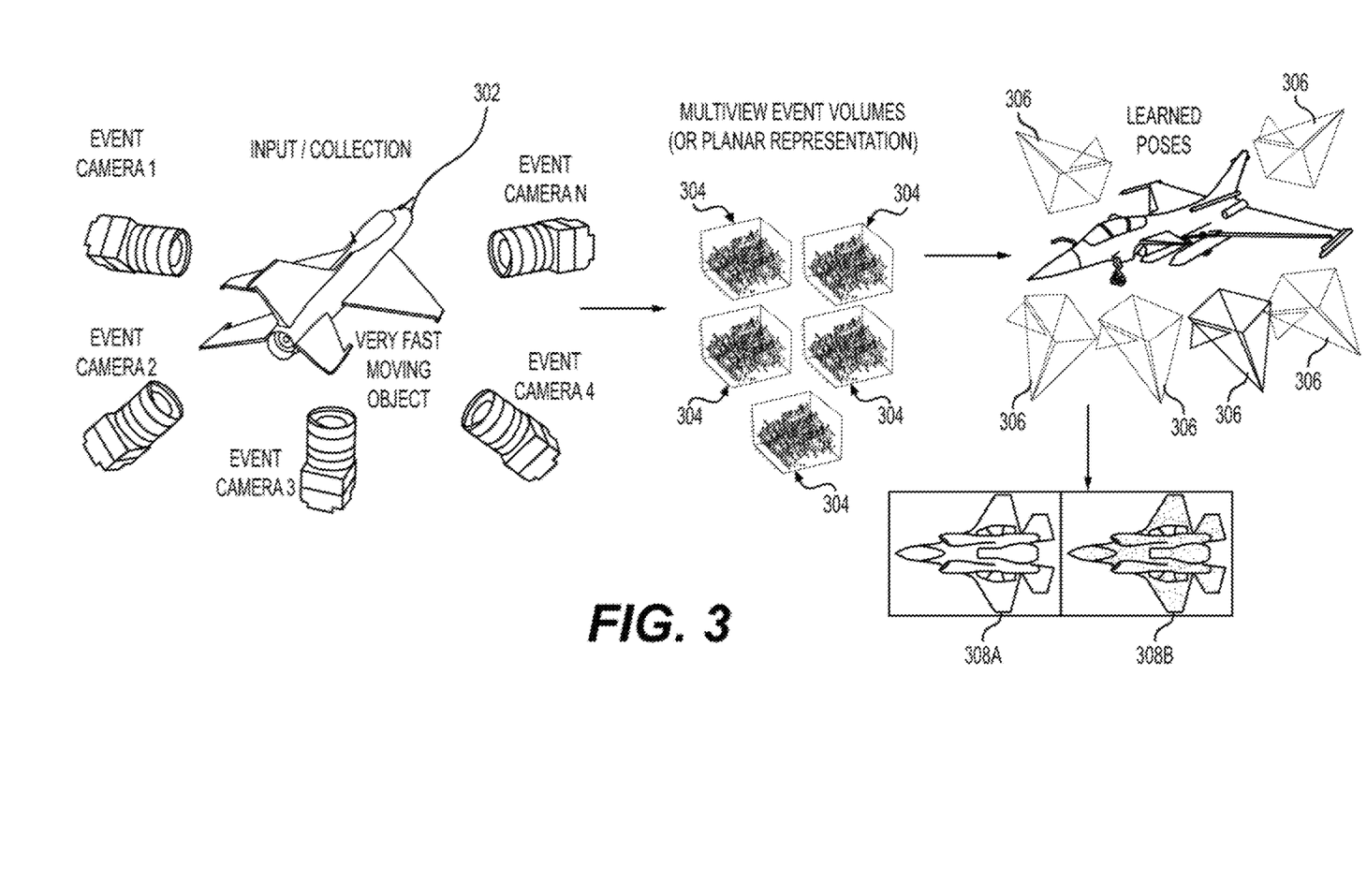
FIG. 3 is a schematic diagram of an example 3D object reconstruction using image processing architecture of FIG. 1.

FIG. 3 is a schematic diagram of an example of 3D object reconstruction using image processing architecture 100. In particular, event camera system 100 includes event cameras 1-N. Each event camera 1-N is a neuromorphic camera. Moreover, each event camera 1-N is posed differently to collect different reference positions of the moving object 302. Note that event camera 1-N outputs unaligned event data collected and stored by event camera system 100. In this case, the unaligned event data are event volumes associated with a particular view. Note the unaligned event data are not aligned in time.

Alignment system 104 receives the unaligned camera data to reduce object boundary blurring associated with aggregating asynchronous events over time from the unaligned event camera data by computing an alignment of aggregated events with respect to a time. This results in alignment system 104 producing aligned event data 304. The aligned event data 304 are time-aligned event volumes associated with each pose. NeRF model 108 receives aligned event data 304 and creates integrated neural volumes 306 based on aligned event data 304 and various poses/views. Using the integrated neural volumes 306, NeRF model 108 produces several novel views 308A and 308B of the moving object 302. NeRF model 210 may use novel views 308A and 308B to generate a synthesized 3D object/point cloud/views given a specified viewpoint. In some implementations, NeRF model 210 may use the generated neural volumes to form event renderings (2D), RGB or other colored image renderings (2D), and/or depth maps (2D).

Figure 4:
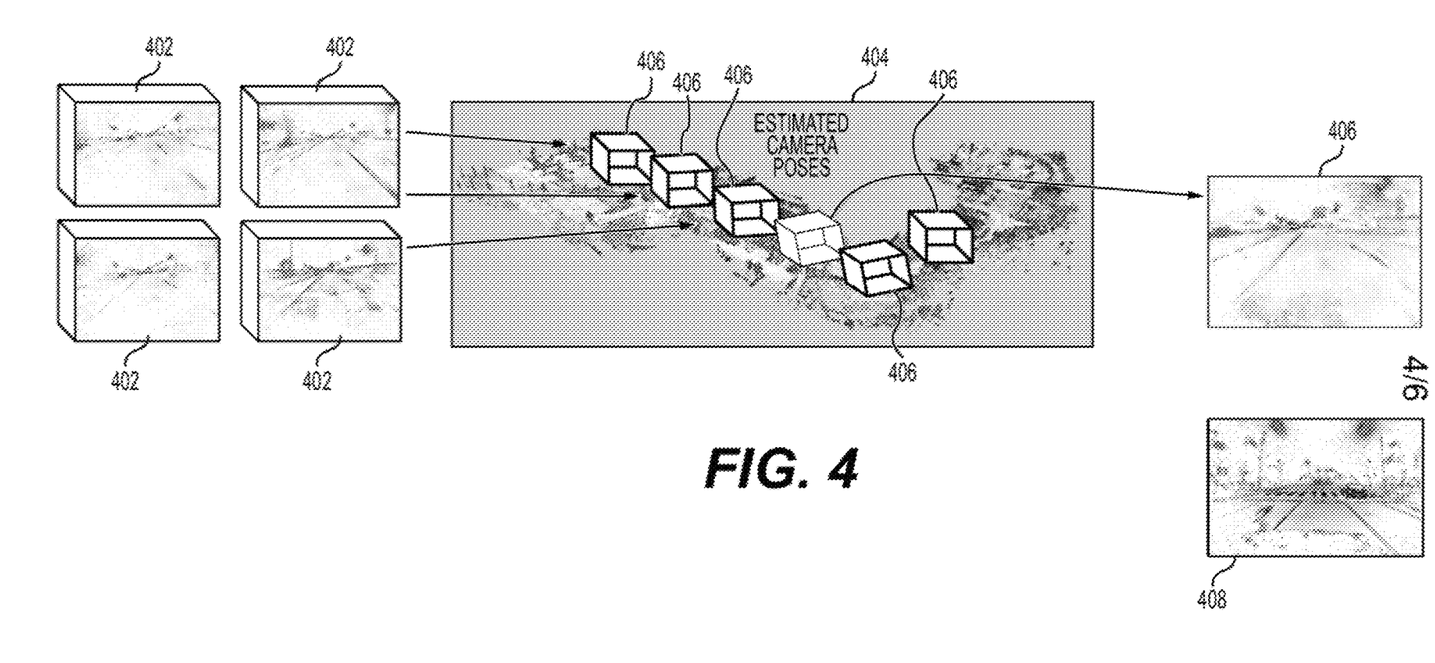
FIG. 4 is a schematic diagram of an example 3D scene reconstruction using image processing architecture of FIG. 2.

FIG. 4 is a schematic diagram of an example 3D scene reconstruction using image processing architecture 200. In this case, time-aligned event data includes time-aligned volumes 402 generated using event camera system 202 and alignment system 204, as described herein. The event camera system 202 may consist of several neuromorphic cameras positioned at different poses and/or locations of the scene. Each neuromorphic camera may capture one or more moving objects. Sometimes, one or more neuromorphic cameras may move while capturing their respective portion of the scene. Each aligned event volume 402 may be associated with at least one of the scene's different poses and/or locations. NeRF model 210 may use time-aligned event volumes 402 to generate a 3D reconstruction 404 of the scene. Moreover, NeRF model 210 may render novel views 406 in event space for each aligned event volume 402 used in the 3D reconstruction 404. In addition, NeRF model 210 may render novel views 408 in RGB space for each aligned event volume 402 via reconstruction from the event space. In other implementations, NeRF model 210 may render novel views 408 in other colored image spaces, such as a greyscale space, HSV space, or the like.

Figure 5:
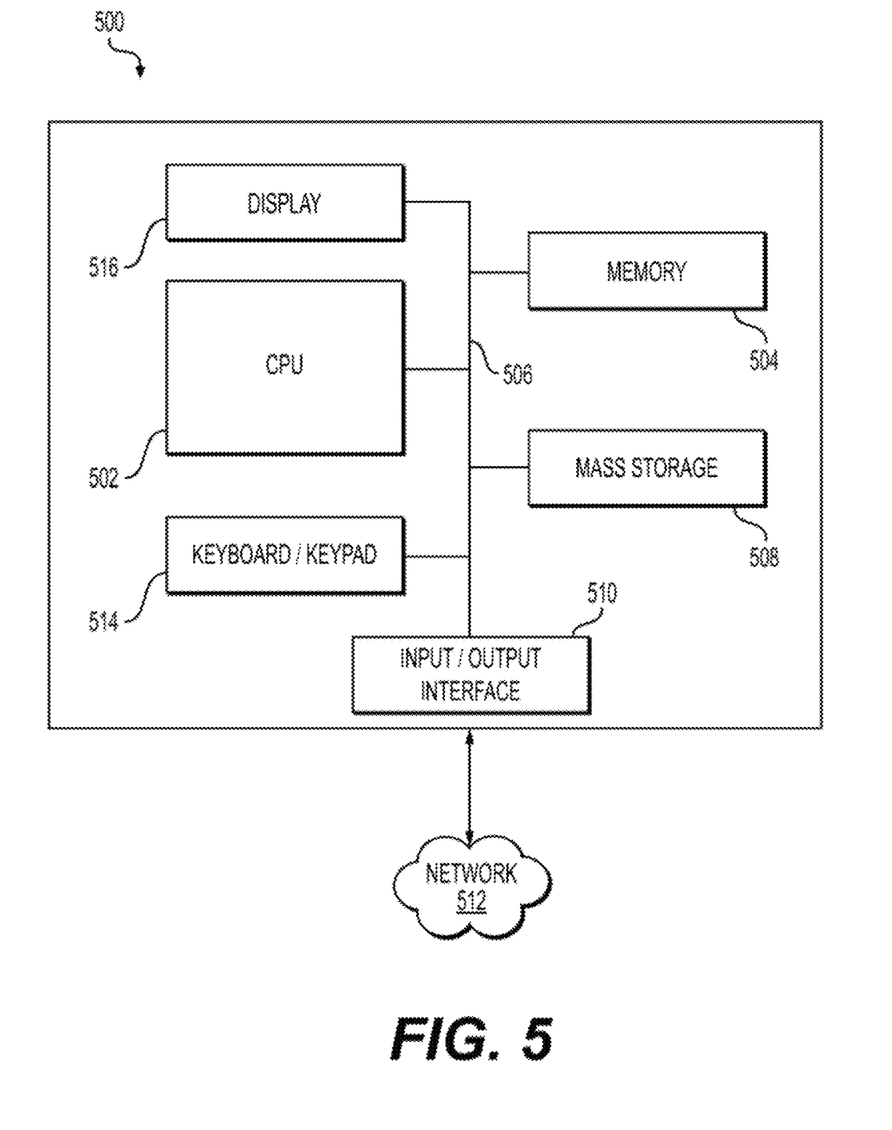
FIG. 5 is a schematic diagram of an exemplary computer system arranged to perform functions associated with the image processing architecture of FIG. 1 and the image processing architecture of FIG. 2.

FIG. 5 shows a diagram of an exemplary computer system 500 arranged to perform functions associated with image processing architecture 100 of FIG. 1 and image processing architecture 200 of FIG. 2. The computer system 500 may be implemented as a virtual machine or a physical machine. The exemplary computer system 500 includes a central processing unit (CPU) 502, a memory 504, and an interconnect bus 506. The CPU 502 may include a single microprocessor or a plurality of microprocessors or special purpose processors for configuring computer system 500 as a multiprocessor system. The memory 504 illustratively includes a main memory and a read only memory. The computer 500 also includes the mass storage device 508 having, for example, various disk drives, tape drives, etc. The memory 504 also includes dynamic random-access memory (DRAM) and high-speed cache memory. In operation, memory 504 stores at least portions of instructions and data for execution by the CPU 502. The memory 504 may also contain computing elements, such as Deep In-Memory Architectures (DIMA), wherein data is sent to memory and a function of the data (e.g., matrix vector multiplication) is read out by the CPU 502.

The mass storage 508 may include one or more magnetic disk, optical disk drives, and/or solid-state memories, for storing data and instructions for use by the CPU 502. At least one component of the mass storage system 508, preferably in the form of a non-volatile disk drive, solid state, or tape drive, stores a database used for processing data and controlling functions associated with receiving user inputs and/or display data associated with an object trajectory prediction system such as system 500. The mass storage system 508 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 500.

The computer system 500 may also include one or more input/output interfaces for communications, shown by way of example, as interface 510 and/or a transceiver for data communications via the network 512. The data interface 510 may be a modem, an Ethernet card or any other suitable data communications device. To provide the functions of a processor according to FIG. 5, the data interface 510 may provide a relatively high-speed link to a network 512, such as an intranet, internet, or the Internet, either directly or through another external interface. The communication link to the network 512 may be, for example, optical, wired, or wireless (e.g., via satellite or cellular network). The computer system 500 may also connect via the data interface 510 and network 512 to at least one other computer system to perform remote or distributed object trajectory prediction operations. Alternatively, the computer system 500 may include a mainframe or other type of host computer system capable of Web-based communications via the network 512. The computer system 500 may include software for operating a network application such as a web server and/or web client.

The computer system 500 may also include suitable input/output ports, that may interface with a portable data storage device, or use the interconnect bus 506 for interconnection with a local display 516, computer mouse, and keyboard 514 or the like serving as a local user interface for programming and/or data retrieval purposes. A mouse may enable a user to position a pointer over a selectable icon and/or button on display 516 to enable the user to make selections and/or configure an object trajectory prediction system to implement a tracking model and/or display selected graphical or other data associated with tracking an object. The display 516 may include a touch screen capability to enable users to interface with the system 500 by touching portions of the surface of the display 516. Server operations personnel may interact with the system 500 for controlling and/or programming the system from remote terminal devices via the network 512.

The computer system 500 may run a variety of application programs and store associated data in a database of mass storage system 508. One or more such applications may include an object trajectory prediction system according to FIG. 5. The components contained in the computer system 500 may enable the computer system to be used as a server, workstation, personal computer, network terminal, mobile computing device, mobile telephone, System on a Chip (SoC), and the like. As discussed above, the computer system 500 may include one or more applications such as system 500. The system 500 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 500 where the system 500 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, MATLAB, Javascript, Java, CSS, Python, Keras, TensorFlow, PHP, Ruby, C++, C. Shell, C#, Objective-C, Go, R, TeX, VimL, Perl, Scala, CoffeeScript, Emacs Lisp, Swift, Fortran, Visual BASIC, HDL, VHDL, and/or one or more versions of Verilog. Certain script-based programs may be employed such as XML, WML, PHP, and so on. The system 500 may use a digital signal processor (DSP).

As stated previously, the mass storage 508 may include a database. The database may be any suitable database system, including the commercially available or open-source products, such as, but not limited to, Microsoft Access, Sybase, SQL Server, MongoDB, SQLite. The database can be implemented as a local or distributed database system. The database may be supported by any suitable persistent data memory, such as a hard disk drive, RAID system, tape drive system, floppy diskette, or any other suitable system. The system 500 may include a database that is integrated with the system, however, it will be understood that, in other implementations, the database and mass storage 508 can be an external element. The database may include object trajectory and/or flight path files, filter modules, sensor modules, and one or more flight path models and/or algorithms associated with system 500.

In certain implementations, the system 500 may include an Internet browser program and/or be configured to operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 100, 200, and/or 500 includes a networked-based, e.g., Internet-based, application that may be configured and run on any combination of the other components of system 100, 200, and/or 500. The computer system 500 may include a web server running a Web 2.0 application or the like. Web applications running on system 500 may use server-side dynamic content generation mechanisms such, without limitation, Java servlets. CGI, PHP, or ASP. In certain embodiments, mashed content may be generated by a web browser running, for example, client-side scripting including, without limitation, JavaScript and/or applets on a wireless device.

In certain implementations, system 100, 200, and/or 500 may include applications that employ Verilog HDL, VHDL, asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 100, 200, and/or computer system 500 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

Figure 6:
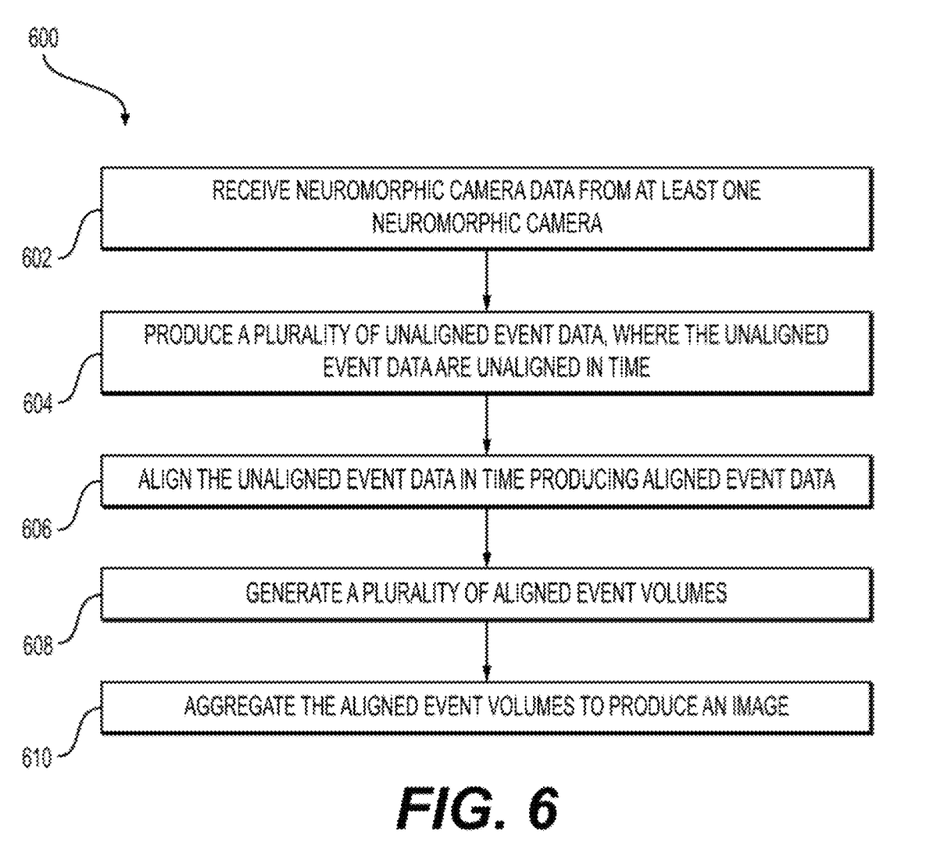
FIG. 6 is a process flowgraph of operations included in an example process 600 for performing image processing.

FIG. 6 is a process flowgraph of operations included in an example process 600 for performing image processing. The operations may be implemented using computer-executable instructions stored on one or more non-transitory machine-readable storage media of computer system 500. The instructions may be executed by one or more processing devices, such as CPU 502, as described in FIG. 5, to implement the operations.

Process 600 includes receiving neuromorphic camera data (for example pixel information from event camera system 102 of FIG. 1 or 202 of FIG. 2 or event cameras 1-N of FIG. 3) from at least one neuromorphic camera (for example event camera system 102 of FIG. 1 or 202 of FIG. 2 or event cameras 1-N of FIG. 3) (602). Moreover, process 600 includes producing, using the neuromorphic camera data, a plurality of unaligned event data (for example unaligned event data of event camera system 102 of FIG. 1 or 202 of FIG. 2) (604). The unaligned event data are unaligned in time. Process 600 includes aligning the unaligned event data in time producing aligned event data (for example aligned event data of event camera system 102 of FIG. 1 or 202 of FIG. 2, aligned event data 304 of FIG. 3, or aligned event data 402 of FIG. 4) (606). Also, process 600 includes generating, using a model and the aligned event data, a plurality of aligned event volumes (integrated neural volumes 306 of FIG. 3 or aligned event volume 402 of FIG. 4) (608). Furthermore, process 600 includes aggregating the aligned event volumes to produce an image (3D Object Reconstruction of FIG. 3 or 3D Scene Reconstruction 404 of FIG. 4) (610).

In some implementations, the neuromorphic camera data includes information regarding at least one pose of at least one neuromorphic camera. The neuromorphic camera data may include data associated with a dynamic scene. The dynamic scene may include at least one moving object. The dynamic scene may include data from at least one moving neuromorphic camera. The unaligned event data may include two-dimensional (2D) multiview event volumes. The aligned event data may include multiview event volumes aligned in time. The model may include a neural radiance field (NeRF) model. The NeRF model may include colored image modalities, such as RGB modalities, greyscale modalities, HSV modalities, or the like, for modeling static objects. Using the aligned event data, one may generate reconstructed colored image aligned event data for rendering one or more views in a colored image space.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A system for performing image processing, the system comprising
one or more computing device processors; and
one or more computing device memories, coupled to the one or more computing device processors, the one or more computing device memories storing instructions executed by the one or more computing device processors, wherein the instructions are configured to:
receive neuromorphic camera data from at least one neuromorphic camera;
produce, using the neuromorphic camera data, a plurality of unaligned event data, where the unaligned event data are unaligned in time;
align the unaligned event data in time producing aligned event data;
generate, using a model and the aligned event data, a plurality of aligned event volumes; and
aggregate the aligned event volumes to produce an image.

2. The system of claim 1, wherein the neuromorphic camera data comprises information regarding at least one pose of the at least one neuromorphic camera.

3. The system of claim 1, wherein the neuromorphic camera data comprises data associated with a dynamic scene.

4. The system of claim 3, wherein the dynamic scene comprises at least one moving object.

5. The system of claim 3, wherein the dynamic scene comprises data from at least one moving neuromorphic camera.

6. The system of claim 1, wherein the unaligned event data comprises two-dimensional (2D) multiview event volumes.

7. The system of claim 1, wherein the aligned event data comprises multiview event volumes aligned in time.

8. The system of claim 1, wherein the model comprises a neural radiance field (NeRF) model.

9. The system of claim 8, wherein the NeRF model comprises colored image modalities for modeling static objects.

10. The system of claim 1, further comprising generating, using the aligned event data, reconstructed colored image aligned event data for rendering one or more views in a colored image space.

11. A method for performing image processing, the method comprising:
receiving neuromorphic camera data from at least one neuromorphic camera;
producing, using the neuromorphic camera data, a plurality of unaligned event data, where the unaligned event data are unaligned in time;
aligning the unaligned event data in time producing aligned event data;
generating, using a model and the aligned event data, a plurality of aligned event volumes; and
aggregating the aligned event volumes to produce an image.

12. The method of claim 11, wherein the neuromorphic camera data comprises information regarding at least one pose of the at least one neuromorphic camera.

13. The method of claim 11, wherein the neuromorphic camera data comprises data associated with a dynamic scene.

14. The method of claim 13, wherein the dynamic scene comprises at least one moving object.

15. The method of claim 13, wherein the dynamic scene comprises data from at least one moving neuromorphic camera.

16. The method of claim 11, wherein the unaligned event data comprises two-dimensional (2D) multiview event volumes.

17. The method of claim 11, wherein the model comprises a neural radiance field (NeRF) model.

18. The method of claim 17, wherein the NeRF model comprises colored image modalities for modeling static objects.

19. The method of claim 11, further comprising generating, using the aligned event data, reconstructed colored image aligned event data for rendering one or more views in an colored image space.

20. A non-transitory computer-readable storage medium storing instructions which when executed by a computer cause the computer to perform a method for performing image processing, the method comprising:
receiving neuromorphic camera data from at least one neuromorphic camera;
producing, using the neuromorphic camera data, a plurality of unaligned event data, where the unaligned event data are unaligned in time;
aligning the unaligned event data in time producing aligned event data;
generating, using a model and the aligned event data, a plurality of aligned event volumes; and aggregating the aligned event volumes to produce an image.

* * * * *